Figure 1:
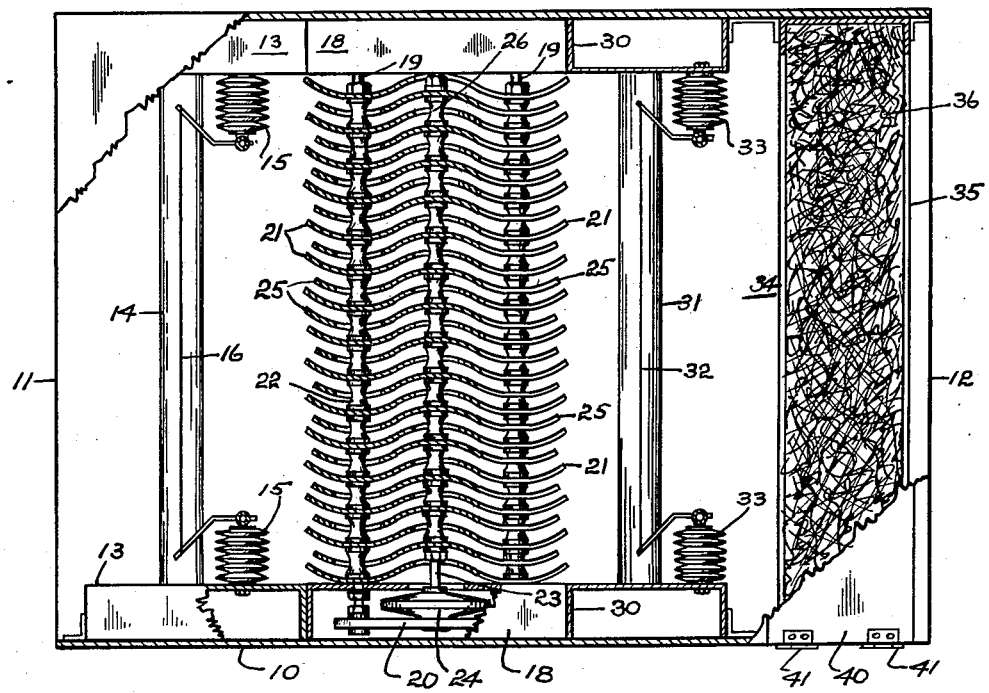

Dec. 18, 1951   R. T. PALMER   2,579,441
ELECTROSTATIC PRECIPITATOR
Filed Feb. 25, 1950

INVENTOR.
Robert T. Palmer

Patented Dec. 18, 1951

2,579,441

UNITED STATES PATENT OFFICE 2,579,441

ELECTROSTATIC PRECIPITATOR

Robert T. Palmer, Sharon, Mass., assignor to Westinghouse Electric Corporation, East Pittsburgh, Pa., a corporation of Pennsylvania Application February 25, 1950, Serial No. 146,178

4 Claims. (Cl. 183—7)

This invention relates to electrostatic precipitators for removing small foreign particles such as dust, from gases such as air.

The usual electrostatic precipitator having an ionizer chamber and a separate collector chamber, has spaced flat collector plates in the collector chamber, electrostatic fields being established between adjacent plates. In such a precipitator, the spacing between the collector plates, their lengths in the direction of gas flow, the strength of the electrostatic fields involved, and the velocity of the gas to be cleaned, are nicely related for avoiding blow-off into the gas stream of particles adhering to the plates. The collected matter adheres to the collector plates which become loaded and have to be cleaned at intervals.

This invention provides an electrostatic precipitator having a first ionizer chamber followed by a collector chamber containing closely spaced collector plates which instead of being flat, are shaped to cause the gas therebetween to follow sinuous paths, being deflected first towards one and then the other of adjacent plates. The gas in a change of direction acts first to blow off a dust particle adhering to a plate, and then in the next change of direction, to blow the dust particle back against the same plate. This repeated action results in agglomeration of, and blow-off of, the dust particles from the plates. The agglomerated particles then pass through a second ionizer chamber where, due to their larger sizes, they take on large electrostatic charges. The second ionizer chamber is followed by a metal wool type of collector cell, between which and the charged agglomerated particles, electrostatic fields are set up, the charged particles inducing mirror image charges of opposite polarity in the metal wool, this causing the particles to be attracted to, and to adhere to, the metal wool, which when it becomes loaded, can be removed and discarded, being replaced with a clean one.

An object of this invention is to provide an electrostatic precipitator having an inexpensive, disposable collector cell.

Another object of this invention is to cause electrostatically charged particles to agglomerate and then to be collected by a filter cell.

Figure 2:
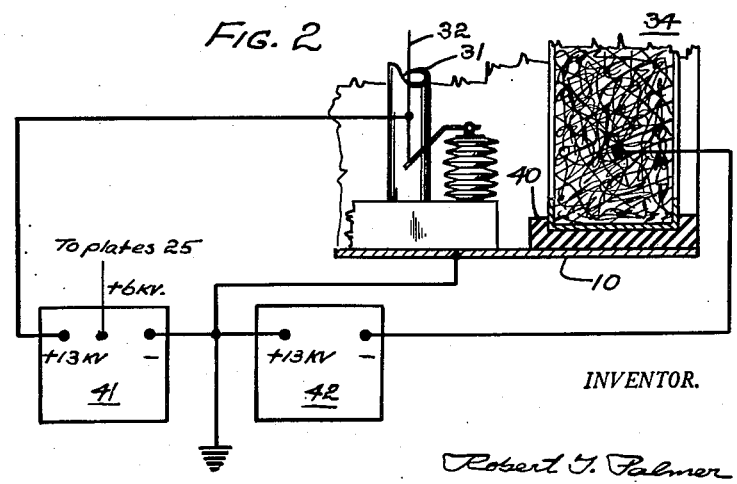

The invention will now be described with reference to the drawing, of which:

Fig. 1 is a plan view, partially in section, of an electrostatic precipitator embodying this invention, and Fig. 2 is a fragmentary view of a modification of the collector cell of Fig. 1.

The casing 10 has an open end 11 forming a gas inlet, and an open end 12 forming a gas outlet. The pan-shaped supports 13 are attached to the vertical sides of the casing 10, adjacent the gas inlet, and support the tubular ionizer electrodes 14 which have their ends attached thereto, and support through the insulators 15, the ionizer wires 16.

The pan-shaped supports 18 are attached to the vertical sides of the casing 10 with their upstream ends in contact with the downstream sides of the supports 13. The tie rods 19 extend through and are bolted to the inner walls of the supports 18, and to the plates 20 which are spaced from the supports 18.

The sinuous, grounded collector plates 21 are assembled on the rods 19 being spaced apart by the spacers 22.

The tie rods 23 have ends which extend through the inner walls of the supports 18, and which are threaded into the inner ends of the insulators 24, the outer ends of which are attached to the plates 20. The sinuous, insulatedly supported, collector plates 25 are assembled on the tie rods 23, being spaced apart by the spacers 26.

The grounded plates 21 have clearance openings through which the tie rods 23 and the spacers 26 extend, and the insulatedly supported plates 25 have clearance openings through which the tie rods 19 and the spacers 22 extend.

The pan-shaped supports 30 are attached to the vertical side walls of the casing 10 with their upstream ends in contact with the downstream ends of the supports 18. The tubular ionizer electrodes 31 are attached at their ends to the supports 30, and the ionizer wires 32 are supported by the insulators 33 from the supports 30.

The collector cell 34 is adapted to be slidably removed and replaced through an opening in one of the vertical sides of the casing 10. The door 40 hinged at 41 to the casing, normally covers this opening. The cell 34 is of the mechanical filter type having an electrically conductive, open ended frame 35 which contacts and is grounded to the casing 10. The frame contains a filamentary mesh 36 such as steel or brass wool.

The ionizer wires 16 and 32 are arranged to be connected to a high voltage terminal of a conventional, direct current, supply source, and which may be the +13 kv. terminal. The insulatedly supported plates 25 are arranged to be connected to a terminal which may be a +6 kv. terminal of the source. The tubular ionizer electrodes 14 and 31, the collector plates 21, and the cell 34 are grounded to the casing and are arranged to be connected to the negative terminal of the supply source.

In operation, the gas to be cleaned is moved through the precipitator by a conventional fan connected to the inlet or outlet thereof, and which is not illustrated. The gas as it passes between the tubular ionizer electrodes 14 and the ionizer wires 16 is ionized, the foreign particles entrained therein being given positive electrostatic charges.

The gas as it passes towards the collector plates moves perpendicular to the tie rods supporting the plates. The upstream ends of the collector plates 21 extend across the path so that the gas strikes and is deflected by the plates. Some of the positively charged particles are directed directly against the upstream ends of grounded plates 21 (the undersides of the plates, facing Fig. 1 of the drawing), and while adhering thereto are swept therealong, contacting other positively charged particles deposited downstream thereof, thereby building up in size. When the gas direction is reversed by the reverse turns of the plates, these agglomerations are blown off at points tangent to the plates 31, which points occur in line with and between the upstream tie rods 19. This action is repeated at the next reverse of the gas.

Some of the positively charged particles strike the upstream ends of the insulatedly supported plates 25 (their undersides facing Fig. 1 of the drawing), are repelled thereby, and on the first change of direction, are swept towards and against the grounded plates 21 where the action described in the preceding paragraph hereof, takes place.

The particles are thus agglomerated, and are swept from the downstream ends of the plates 21 by the gas stream. When they pass between the downstream tubular ionizer electrodes 31 and ionizer wires 32, due to their relatively large sizes, they take on relatively large electrostatic charges. Then, as they approach the cell 34, they induce mirror image charges in the metal wool therein, causing the charged particles to be attracted to and to deposit upon the metal wool. The cell 34 has, of course, mechanical filter action which aids the electrical action.

The modification of the invention illustrated by Fig. 2 of the drawing, consists in insulating the cell 34 from the casing 10 with the insulating supports 40, and in placing a —13 kv. charge, with respect to ground, on the metal wool in the cell.

The two power packs 41 and 42 are connected in series, the negative terminal of the power pack 41 being connected to the precipitator casing 10, its +13 kv. terminal being connected to the ionizer wires 31, and its +6 kv. terminal being connected to the collector plates 25 as in Fig. 1. The positive terminal of the power pack 42 is grounded and its negative terminal is connected to the metal wool in the cell 34.

This places a 26 kv. difference of potential between the ionizer wires 32 and the cell 34. A strong electrostatic field is thus established between the positively charged particles approaching the cell, and the negatively charged cell, resulting in the cell more effectively collecting the charged particles.

While embodiments of the invention have been described for the purpose of illustration, it should be understood that the invention is not limited to the exact apparatus and arrangement of apparatus illustrated, as modifications thereof may be suggested by those skilled in the art, without departure from the essence of the invention.

What I claim is:

1. An electrostatic precipitator for removing foreign particles from a gas, comprising spaced, sinuous plates forming agglomerator electrodes, alternate of said plates being insulated from the others thereof, a high voltage, direct current supply connected to charge said alternate plates with a voltage having one polarity and said other plates with a voltage having the opposite polarity, a collector cell of intermeshed conductive filaments downstream with respect to gas flow of said plates, and means connecting said filaments to said supply.

2. An electrostatic precipitator as claimed in claim 1 in which ionizer electrodes are located between said plates and cell and connected to said supply.

3. An electrostatic precipitator for removing foreign particles from a gas, comprising spaced discharging and non-discharging ionizer electrodes, a metal frame, means for grounding said non-discharging electrode to said frame, a collector cell downstream with respect to gas flow of said electrodes, means insulating said cell from said frame, said cell having intermeshed conductive filaments, and means for charging said discharging electrode and said filaments to opposite polarities with respect to ground.

4. An electrostatic precipitator as claimed in claim 3 in which the discharging electrode is charged to a positive potential with respect to ground, and the filaments are charged to a negative potential with respect to ground.

ROBERT T. PALMER.

REFERENCES CITED

The following references are of record in the file of this patent:

UNITED STATES PATENTS

| Number | Name | Date |
|---|---|---|
| 1,951,867 | Grilli | Mar. 20, 1934 |
| 2,142,128 | Hoss et al. | Jan. 3, 1939 |
| 2,199,390 | Anderson | May 7, 1940 |
| 2,297,601 | Williams | Sept. 29, 1942 |

FOREIGN PATENTS

| Number | Country | Date |
|---|---|---|
| 438,834 | Germany | Dec. 29, 1926 |